(12) United States Patent
Nistor et al.

(10) Patent No.: US 10,967,567 B2
(45) Date of Patent: Apr. 6, 2021

(54) METHOD OF FORMING A THREE-DIMENSIONAL OBJECT

(71) Applicant: Océ Holding B.V., Venlo (NL)

(72) Inventors: Mircea Nistor, Timisoara (RO); Violeta Iacob, Timisoara (RO)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 280 days.

(21) Appl. No.: 16/026,567

(22) Filed: Jul. 3, 2018

(65) Prior Publication Data

US 2019/0016044 A1    Jan. 17, 2019

(30) Foreign Application Priority Data

Jul. 11, 2017  (EP) ..................................... 17180705

(51) Int. Cl.
| | | |
|---|---|---|
| *B29C 64/188* | (2017.01) | |
| *B29C 64/112* | (2017.01) | |
| *B29C 69/02* | (2006.01) | |
| *B29C 64/386* | (2017.01) | |
| *B33Y 50/00* | (2015.01) | |
| *B33Y 10/00* | (2015.01) | |
| *B33Y 30/00* | (2015.01) | |

(Continued)

(52) U.S. Cl.
CPC ............ *B29C 64/188* (2017.08); *B29C 51/10* (2013.01); *B29C 51/16* (2013.01); *B29C 51/36* (2013.01); *B29C 64/112* (2017.08); *B29C 64/245* (2017.08); *B29C 64/386* (2017.08); *B29C 69/02* (2013.01); *B33Y 10/00* (2014.12); *B33Y 30/00* (2014.12); *B33Y 40/00* (2014.12); *B33Y 50/00* (2014.12); *B33Y 80/00* (2014.12); *B29L 2031/40* (2013.01)

(58) Field of Classification Search
CPC ..... B29C 64/188; B29C 64/386; B29C 69/02; B33Y 10/00
See application file for complete search history.

(56) References Cited

U.S. PATENT DOCUMENTS

| | | | | |
|---|---|---|---|---|
| 2005/0069682 A1* | 3/2005 | Tseng | ................. | G05B 19/4099 |
| | | | | 428/195.1 |
| 2010/0102476 A1* | 4/2010 | Higgins | .............. | B29C 33/3835 |
| | | | | 264/219 |
| 2016/0075090 A1* | 3/2016 | Kautz | ................... | B29C 64/393 |
| | | | | 428/64.1 |

FOREIGN PATENT DOCUMENTS

| | | |
|---|---|---|
| CA | 2187123 A | 4/1998 |
| CN | 105948205 A | 9/2016 |

(Continued)

OTHER PUBLICATIONS

Search Report issued in European Patent Application No. 17 18 0705, dated Jan. 11, 2018.

*Primary Examiner* — Kelly M Gambetta
(74) *Attorney, Agent, or Firm* — Birch, Stewart, Kolasch & Birch, LLP

(57) ABSTRACT

A method of forming a three-dimensional object 38 with a shape determined by model data defining a model 10 of the object, characterized by the steps of:
a) splitting the model 10 into a high elevation/low resolution base part 18 and a low elevation/high resolution cover part 20';
b) forming a base body 30 with a shape as determined by the base part 18 of the model;
c) employing a 3D printing technique for printing a sheet-like cover body 34 with a shape as determined by the cover part 20' of the model; and
d) matching the cover body 34 to the base body 30 by vacuum forming.

8 Claims, 4 Drawing Sheets

(51) Int. Cl.
*B33Y 40/00* (2020.01)
*B29C 51/10* (2006.01)
*B29C 51/36* (2006.01)
*B33Y 80/00* (2015.01)
*B29C 51/16* (2006.01)
*B29C 64/245* (2017.01)
*B29L 31/40* (2006.01)

(56) References Cited

FOREIGN PATENT DOCUMENTS

| | | |
|---|---|---|
| EP | 1 112 828 A1 | 7/2001 |
| JP | 2003-200487 A | 7/2003 |

\* cited by examiner

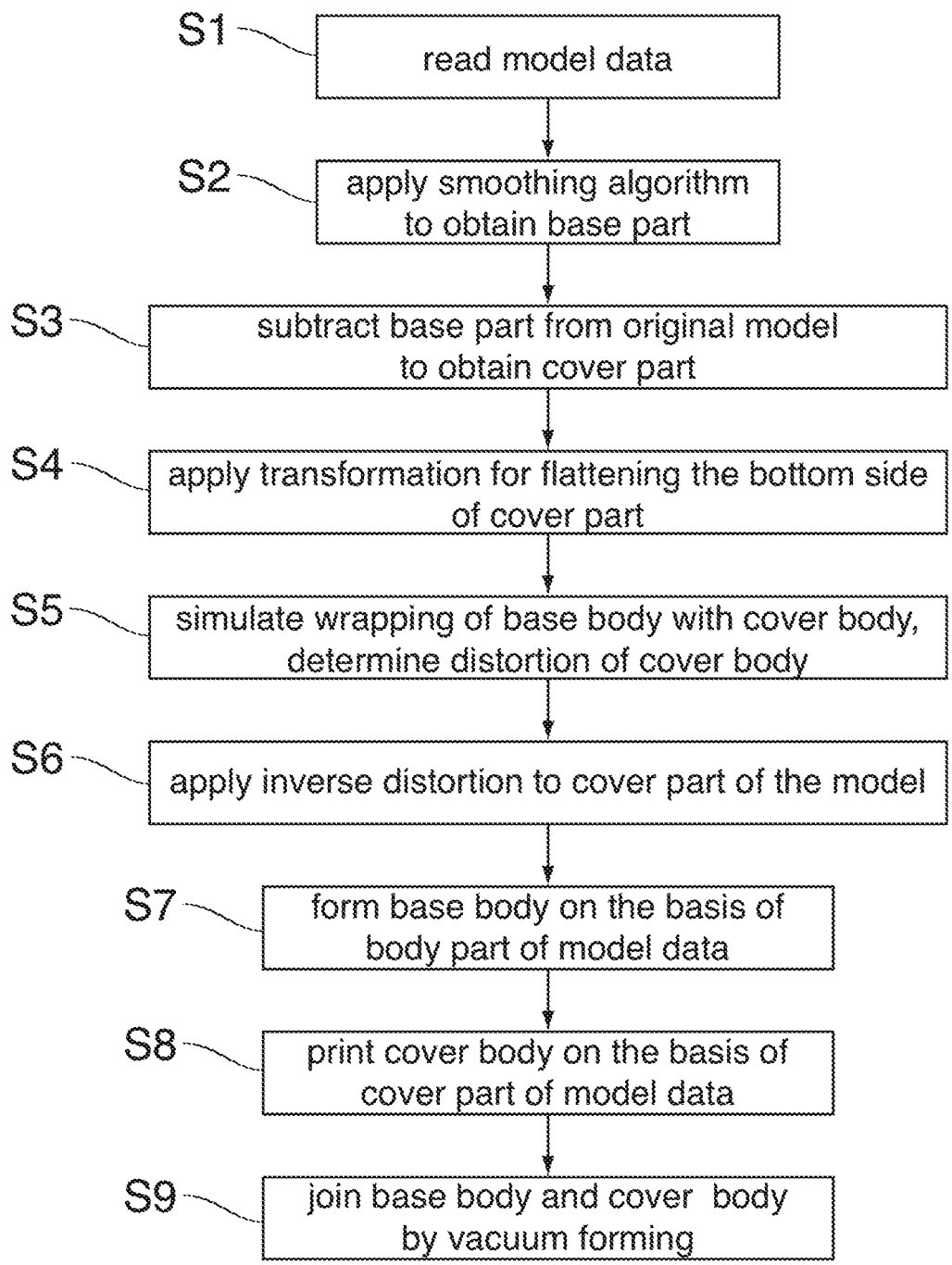

METHOD OF FORMING A THREE-DIMENSIONAL OBJECT

FIELD OF THE INVENTION

The invention relates to a method of forming a three-dimensional object with a shape determined by model data defining a model of the object.

BACKGROUND OF THE INVENTION

Conventional methods of forming three-dimensional objects comprise for example injection molding, hand-molding and firing material such as clay or the like, and machining a solid blank of, e.g. wood or metal, e.g. by means of a CNC machine tool.

Injection molding requires a specific mold and is therefore economical only in cases where a large number of objects with identical shape have to be formed. Hand-molding three-dimensional objects is laborious and requires a high skill.

Machining operations for forming three-dimensional objects can become very complicated, especially when the object to be formed has a surface relief with fine detail.

More recently, it has also become known to employ printing techniques, in particular ink jet printing, for forming three-dimensional objects by superposing several layers of curable ink. These techniques, which are termed "3D printing" or, if the elevation of the printed object is not too high, "2.5 D printing" or "relief printing". The term "3D printing" shall be used here as a generic term encompassing all these types of print process. The 3D printing techniques have the advantage that they permit to render fine details on the surface of the three-dimensional object and also permit to print a surface layer of the objects directly in the desired color.

However, these techniques tend to become inefficient if the object to be formed has a very high elevation requiring that large amounts of ink have to be applied and cured in order to obtain a large-volume bulk body.

Moreover, it is common practice to cure the ink by means of radiation, e.g. UV light.

Then, when the elevation of the printed object increases, the curing lamps have to be arranged at a large distance above the print surface, so that there is a considerable risk of hazard.

SUMMARY OF THE INVENTION

It is an object of the invention to provide a method of forming three-dimensional objects, which method involves printing techniques that are safer and/or more efficient.

In order to achieve this object, the method according to the invention is characterized by the steps of:
a) splitting the model into a high elevation/low resolution base part and a low elevation/high resolution cover part;
b) forming a base body with a shape as determined by the base part of the model;
c) employing a 3D printing technique for printing a sheet-like cover body with a shape as determined by the cover part of the model; and
d) matching cover body to the base body by vacuum forming.

The invention combines 3D printing techniques with conventional forming techniques. The more efficient conventional forming techniques are used for forming the base part which may have a high elevation but has only a low resolution, i.e. a relatively smooth surface, whereas the more detailed surface structure is provided by printing the sheet-like cover body, which will have a significantly lower elevation, so that it can safely and efficiently be printed with a 3D printer which is capable of rendering fine details of the surface structure with high spatial resolution. The three-dimensional object is then completed by using the well established vacuum forming technique for matching the cover body to the base body.

More specific optional features of the invention are indicated in the dependent claims.

It is preferred that, in the printing step c), an ink is used that retains a certain resiliency even in the cured state, so that the sheet-like cover body may be deformed to some extent in order to match the surface of the base body in the vacuum forming step d).

If the surface of the base body is curved in two dimensions, it is further preferred that the cured ink has also elastic properties, so that the sheet-like cover body may be stretched locally in order to match the non-euclidian geometry of the base body surface.

The model data defining the model of the object may be electronic data and may for example comprise the coordinates of grid points defining a grid model of the object. The step a) of splitting the model into the base part and the cover part may comprise applying a smoothing algorithm in order to obtain the low resolution base part. Then, the high resolution cover part may be obtained by subtracting the base part from the original model, optionally after having scaled down or clipped the base part to some extent so as to assure that the remaining cover part has a positive thickness at all grid points.

The step b) of forming the base body may comprise any known forming techniques including additive techniques such as 3D printing (with a high production/low resolution 3D printer), as well as subtractive techniques using for example a flat bed cutter or a multi-axis machining system.

In the printing step c) the ink may be applied onto a flexible and possibly stretchable substrate sheet to which the ink adheres, so that the substrate becomes part of the cover body. As an alternative, the ink may be printed directly onto the print surface of the printer, the print surface having a composition or coating ensuring that the ink will not adhere to the print surface, so that the printed cover body can be released easily.

In the matching step d) the base body is used as a mold for suitably deforming the cover body.

In one embodiment the step of vacuum forming may include bonding the cover body to the base body, so that the base body remains part of the three-dimensional object and assures that the vacuum-formed cover body retains its shape. In some applications where three-dimensional objects with similar general shapes are to be formed, it may be possible to perform the splitting step a) in such a way that the base parts for a plurality of objects have an identical shape and the objects differ only in the shape of their cover part. Then, a large number of identical base bodies may be formed efficiently, for example by means of injection molding, and the final objects are individualized by printing different cover bodies and vacuum forming them onto the base bodies.

In a further development of the invention, it may be possible to employ an ink that is cured only partly in the printing step c), so that the ink body is still deformable to some extent, but can be cured further, e.g. by firing, in order to obtain a rigid body after the vacuum forming step d). In that case, the base body will serve only as a mold for vacuum forming and may be discarded afterwards, so that the resulting three-dimensional object is a hollow object consisting only of the cover body which retains its shape due to the last curing step after vacuum forming. This embodiment has the advantage that the step b) for forming the base body needs to be performed only once in a production process in which a plurality of three-dimensional objects with identical or similar shapes are formed.

BRIEF DESCRIPTION OF THE DRAWINGS OF THE INVENTION

Embodiment examples will now be described in conjunction with the drawings, wherein:

FIG. 7 is a flow diagram showing essential steps of a method according to the invention.

DESCRIPTION OF THE EMBODIMENTS OF THE INVENTION

Figure 1:
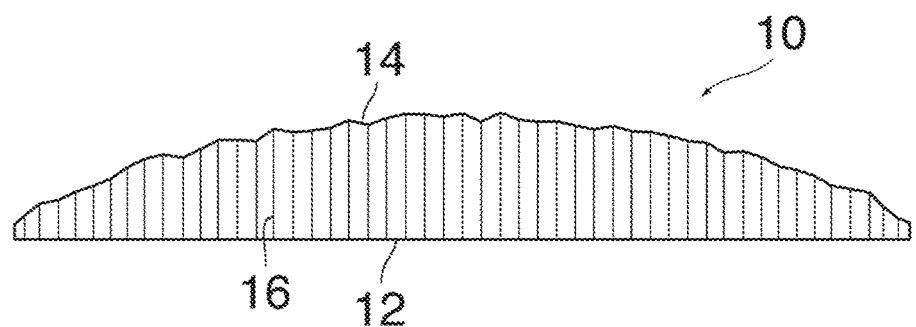
FIG. 1 shows an example of a model of a three-dimensional object.

FIG. 1 shows, in a vertical cross-section, a model 10 of a three-dimensional object which is generally lens-shaped and has a flat bottom surface 12 and a textured top surface 14. The model 10 is a grid model in which a regular mesh of grid points is overlaid on the bottom surface 12, and the textured top surface 14 is defined by assigning a height value to each grid point. The sectional view in FIG. 1 shows only the grid points that are located within the sectional plane. For each of these grid points, a line 16 has been shown which connects the grid point on the bottom surface 12 to the corresponding point on the top surface 14.

Figure 2:
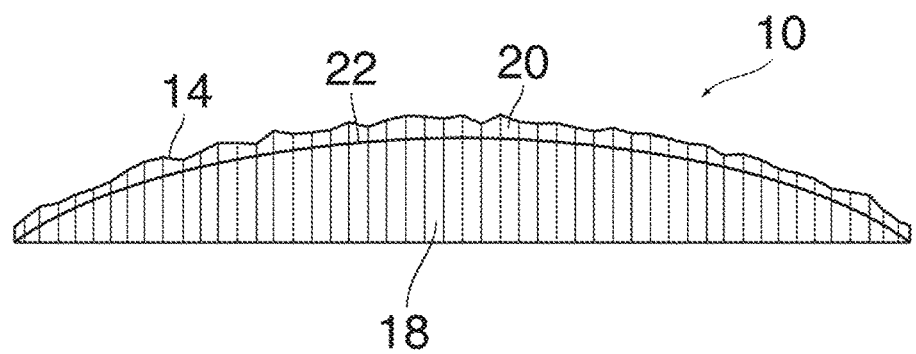
FIGS. 2 and 3 illustrate a step of splitting the model shown in FIG. 1 into a base part and a cover part.

In FIG. 2 the model 10 is split into a base part 18 and an overlying cover part 20. The base part 18 has a relatively large elevation and a relatively smooth top surface 22 which can be obtained by applying a smoothing algorithm and slightly shrinking the original model 10 shown in FIG. 1. More particularly, in this embodiment, the smoothing algorithm, e.g. Laplacian smoothing, has been applied to the grid points defining the top surface 14, and the smoothened surface has been shifted downwards by a certain amount so as to shrink the base part 18 and to assure that the top surface 22 of the base part will nowhere exceed the height of the top surface 14 of the model as a whole.

Figure 3:
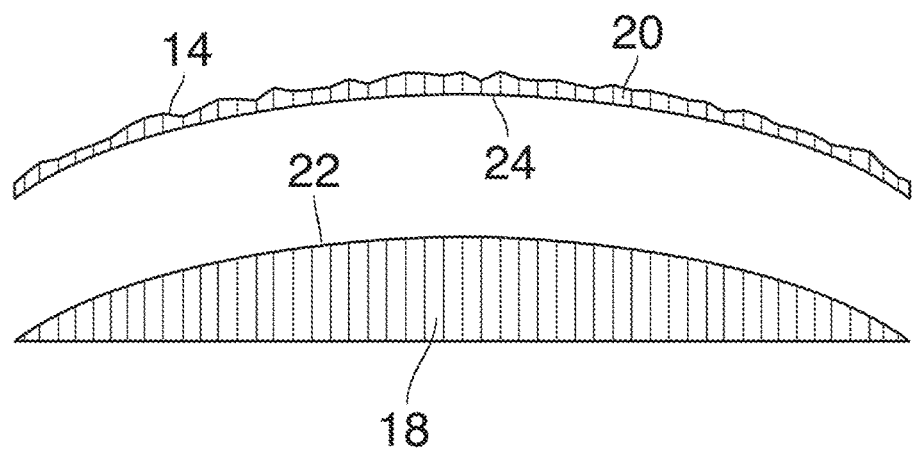

In FIG. 3 the base part 18 and the cover part 20 of the model have been shown separately. The cover part 20 has a top surface identical with the top surface 14 of the original model and a curved bottom surface 24 which matches the top surface 22 of the base part 18.

Figure 4:
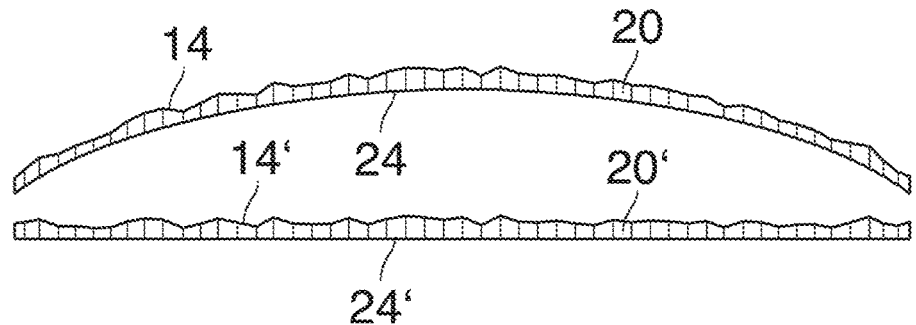
FIG. 4 illustrates a step of transforming the cover part of the model.

FIG. 4 illustrates a transformation that is applied to the cover part 20 and which converts the curved bottom surface 24 of the cover part into a flat bottom surface 24' while preserving the spatial relation (height difference) between the bottom surface 24 and the top surface 14 at each grid point. The transformed cover part 20' is obtained by diminishing, at each grid point, the height of both the corresponding point on the bottom surface 24 and the corresponding point on the top surface 14 by the height of the top surface 22 of the base part 18 (FIG. 3) at the same grid point.

Figure 5:
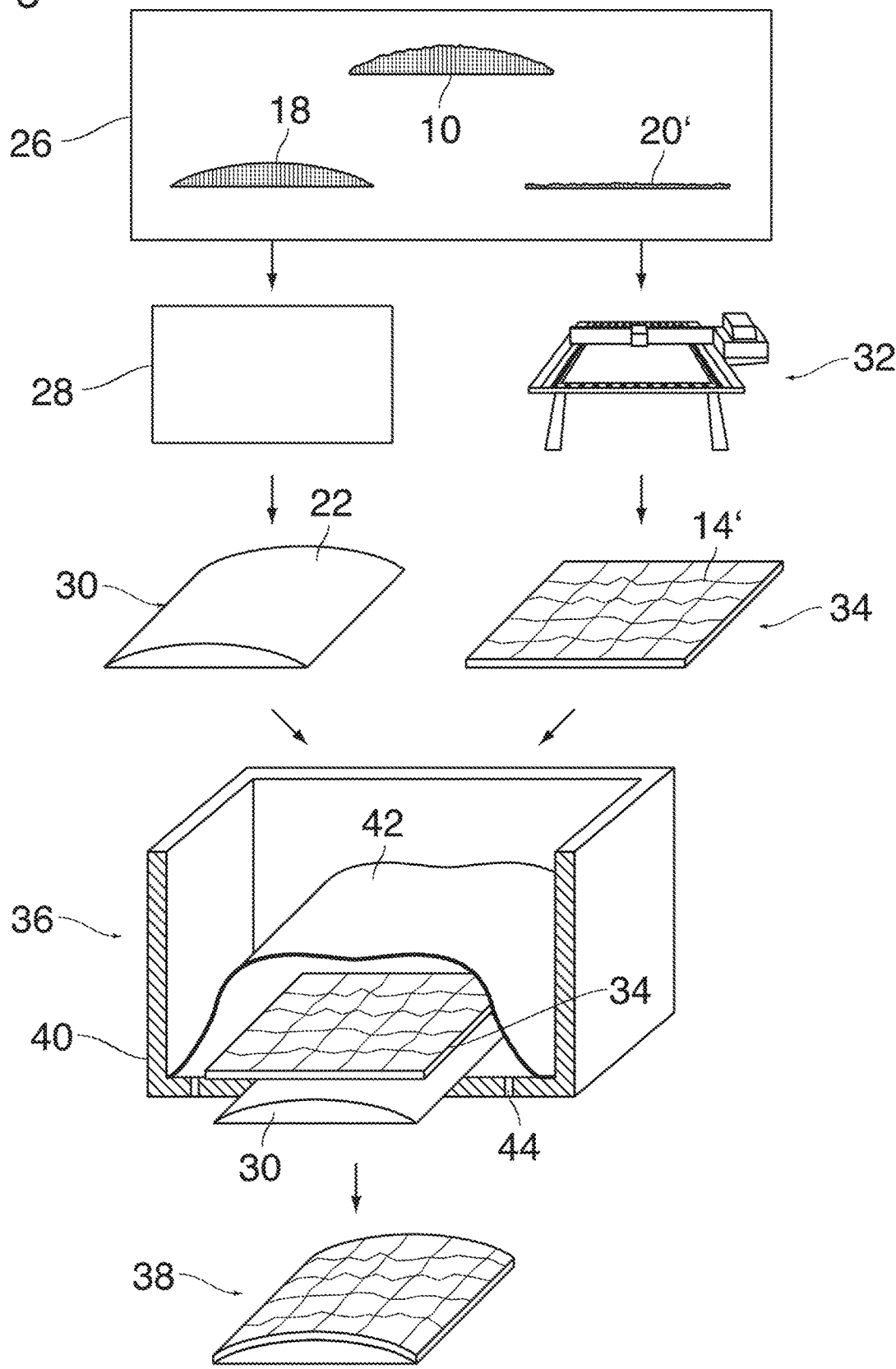
FIG. 5 is a diagram illustrating a workflow of a method according to the invention.

FIG. 5 schematically shows a data processing system 26 where the data that define the model 10 are processed in the manner that has been described above in conjunction with FIGS. 1 to 4.

The data that describe the base part 18 of the model are then transmitted to a forming implement 28, e.g. a CNC machine tool, where the data are used for controlling the machine tool so as to machine a blank (e.g. of wood, metal, plastics or any other suitable material) so as to obtain a base body 30 with a shape that has been defined by the base part 18 of the model.

Similarly, the data that describe the cover part, more particularly the transformed cover part 20', are transmitted to a printer 32, e.g. a flat bed ink jet printer that is capable of 3D or relief printing. On the basis of these data, the printer 32 is controlled to print a cover body 34 with a shape as defined by the cover part of the model data. The printer 32 is capable of printing with a high spatial resolution and is therefore capable of rendering the fine detail of the structured top surface 14'. The flat bottom surface of the cover body 34 (not visible in FIG. 5) is formed by the first layer of ink that is printed directly on the print surface of the printer 32.

FIG. 5 further shows, in a sectioned perspective view, a vacuum forming implement 36 in which the base body 30 and the cover body 34 are joined together so as to form a three-dimensional object 38 with a shape as determined by the model 10.

Since the vacuum forming technology is well known, only a brief description will be given here. The vacuum forming implement 36 comprises a vacuum chamber 40 in which the base body 30 and the cover body 34 are positioned such that the cover body 34 overlays the top surface of the base body 30. A flexible bellows 42 covers the base body 30 and the cover body 34 and is sealed against a bottom wall of the vacuum chamber 20, so that the air between this bottom wall and the bellows 42 may be evacuated via suction holes 44. As a result, the bellows 42 shrinks and evenly presses the cover body 34 against the base body 30 on its entire surface. In this process, the cover body 34 is bent so that its bottom surface matches again the top surface of the base body 30 and the cover body as a whole reassumes the shape that is defined by the cover part 20 of the model in the non-transformed state as shown in FIG. 3.

It will be understood that, by applying adhesive to the top surface of the base body 30 and/or the bottom surface of the cover body 34, the cover body may be firmly bonded to the base body, so that these components stick together in the final three-dimensional object 38.

In the embodiment shown in FIG. 5, the base body 30 has the shape of a cylindrical lens, so that its top surface 22 is curved only in one dimension and, as a result, the flat, sheet-like cover body 34 can be smoothly wrapped around this surface.

Figure 6:
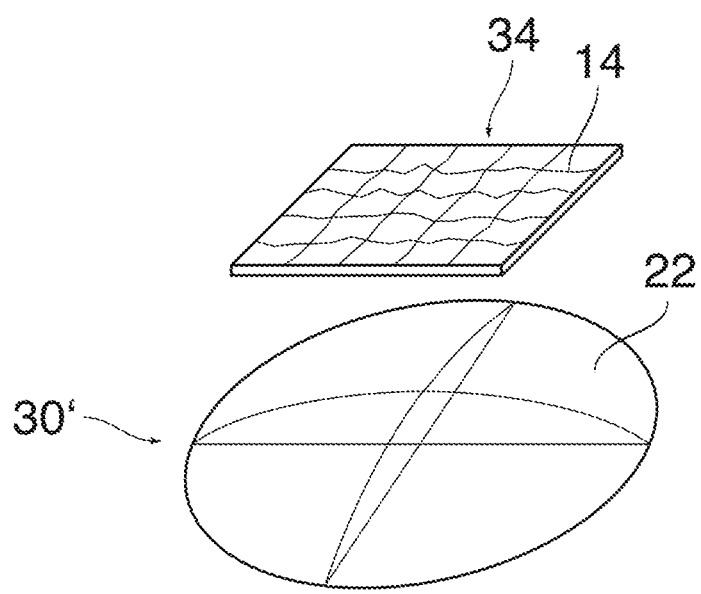
FIG. 6 is a perspective view of a base body and a part of a cover body of a three-dimensional object having a surface curved in two dimensions.

If the body of cured ink that constitutes the cover body 34 is stretchable to a certain extent, it is also possible to form three-dimensional objects in which the base body 30' is curved in two dimensions, as has been shown in FIG. 6. Then, when the cover body 34, of which only a portion has been shown in FIG. 6, is bonded to the top surface 22 of the base body 30', the cover body has to be stretched locally in order to adapt to the curved shape of the base body. This may lead to a minor distortion of the cover body 34 and, consequently, also of its textured top surface. In many cases these minor distortions will be tolerable. If a higher precision is required, it is also possible to compensate for these distortions by modifying the shape of the top surface 14' in the transformed version of the cover part 20' of the model such that the distortions which occur during vacuum forming restore the original shape of the top surface.

Essential steps of a method according to the invention will now be described by reference to the flow diagram shown in FIG. 7.

In step S1, the model data defining the model 10 are read into the data processing system 26 or are created directly in the data processing system.

In step S2, a smoothing algorithm, preferably a Laplacian smoothing algorithm is applied to the model 10 in order to obtain the base part 18 of the model.

Then, in step S3, the base part 18 is subtracted from the original model 10, so that what remains is the cover part 20 of the model as shown in FIG. 3.

The transformation illustrated in FIG. 4, for flattening the bottom side of the cover part, is applied in step S4, resulting in the transformed version of the cover part.

In an optional step 5 which is preferably performed when the top surface of the base part is curved in two dimensions, the wrapping of the base body with the cover body is simulated in order to determine the amount by which the (elastic) cover body will be distorted (stretched), i.e. the amount by which each grid point will shift within the bottom surface of the cover part. The result may then be used in step S6 for applying an inverse distortion to the transformed version of the cover part 20' of the model, so that the original shape of the top surface 14 will be restored later in the vacuum forming step.

In step S7, any conventional forming technique is used for forming the base body 30 or 30' on the basis of the base part 18 of the model.

In step S8, the cover body 34 is printed with the flat bed printer 32 on the basis of the cover part 20' of the model data.

Finally, the vacuum forming step S9 is performed for joining the base body and the cover body and bonding them together.

The invention claimed is:

1. A method of forming a three-dimensional object with a shape determined by model data defining a model of the object, wherein the model is a grid model in which a regular mesh of grid points is overlaid on a bottom surface and a textured top surface is defined by assigning a height value to each grid point, the method comprising the steps of:

a) splitting the model into a high elevation/low resolution base part and a low elevation/high resolution cover part having a textured top surface identical to the textured top surface of the model, and a curved bottom surface which matches a top surface of the high elevation/low resolution base part, said textured top surface of the low elevation/high resolution cover part making the cover part not flat;
   b) forming a base body with a shape as determined by the base part of the model;
   c) transforming the low elevation/high resolution cover part by a conversion of the curved bottom surface of the low elevation/high resolution cover part into a flat bottom surface while preserving a spatial relation between the curved bottom surface and the textured top surface at each grid point;
   d) employing a 3D printing technique for printing a sheet-like cover body with a shape as determined by the transformed cover part of the model; and
   e) matching the cover body to the base body by vacuum forming.

2. The method according to claim 1, wherein an ink used in the printing step d) is selected to result in a cured ink body which constitutes the cover body and has a certain resiliency.

3. The method according to claim 2 wherein the ink is selected to result in a sheet-like cover body which is stretchable.

4. The method according to claim 1, wherein step a) comprises smoothing the model in order to obtain the base part.

5. The method according to claim 4, wherein the step of smoothing the model further comprises Laplacian smoothing the model.

6. The method according to claim 1, wherein the step d) is performed with a flat bed ink jet printer.

7. The method according to claim 1, wherein, in step e), the cover body is bonded to the base body.

8. The method according to claim 1, wherein in step c), at each grid point, a height of both the corresponding grid point on the curved bottom surface and the corresponding grid point on the textured top surface is diminished by a height of the top surface of the high elevation/low resolution base part at the same grid point.

\* \* \* \* \*